United States Patent
Metz

(10) Patent No.: US 6,619,664 B1
(45) Date of Patent: Sep. 16, 2003

(54) WEAR IMPROVEMENT TO TEXTURED LIP SEAL

(75) Inventor: Jerry A. Metz, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/216,551

(22) Filed: Dec. 18, 1998

(51) Int. Cl.⁷ ................................................ F16J 15/34
(52) U.S. Cl. ...................... 277/399; 277/549; 277/574; 277/400
(58) Field of Search ................. 277/306, 399, 277/400, 402, 436, 549, 562, 430, 559, 574

(56) References Cited

U.S. PATENT DOCUMENTS

| | | |
|---|---|---|
| 1,876,520 A | 9/1932 | Newkirk et al. |
| 2,006,602 A * | 7/1935 | Muster .................. 277/530 |
| 2,009,281 A | 7/1935 | Stein |
| 2,489,715 A | 11/1949 | Mark et al. |
| 3,312,376 A | 4/1967 | Rooney |
| 3,376,045 A * | 4/1968 | Jagger .................. 277/559 |
| 3,572,730 A | 3/1971 | Otto et al. |
| 3,616,125 A | 10/1971 | Bowling |
| 4,084,826 A * | 4/1978 | Vossieck et al. |
| 4,288,083 A * | 9/1981 | Braconier |
| 4,685,685 A * | 8/1987 | Iverson |
| 5,139,275 A * | 8/1992 | Ehrmann et al. |
| 5,195,757 A * | 3/1993 | Dahll, V .................. 277/559 |
| 5,322,299 A | 6/1994 | Terai |
| 6,029,980 A * | 2/2000 | Downes .................. 277/552 |
| 6,105,968 A * | 8/2000 | Yeh et al. .................. 277/399 |

FOREIGN PATENT DOCUMENTS

JP 0150661 11/1981

* cited by examiner

*Primary Examiner*—Anthony Knight
*Assistant Examiner*—E Peavey
(74) *Attorney, Agent, or Firm*—Maginot, Addison & Moore; Steve M Hanley

(57) ABSTRACT

Multiple circumferential rows of textured features are formed between the outer peripheral edge and the inner peripheral edge of a seal. The multiple circumferential rows of textured features form a boundary for incoming dirt and wash away abrasive particles as well as act as lubricant wells. The multiple rows provide additional protection from leakage and wear.

10 Claims, 3 Drawing Sheets

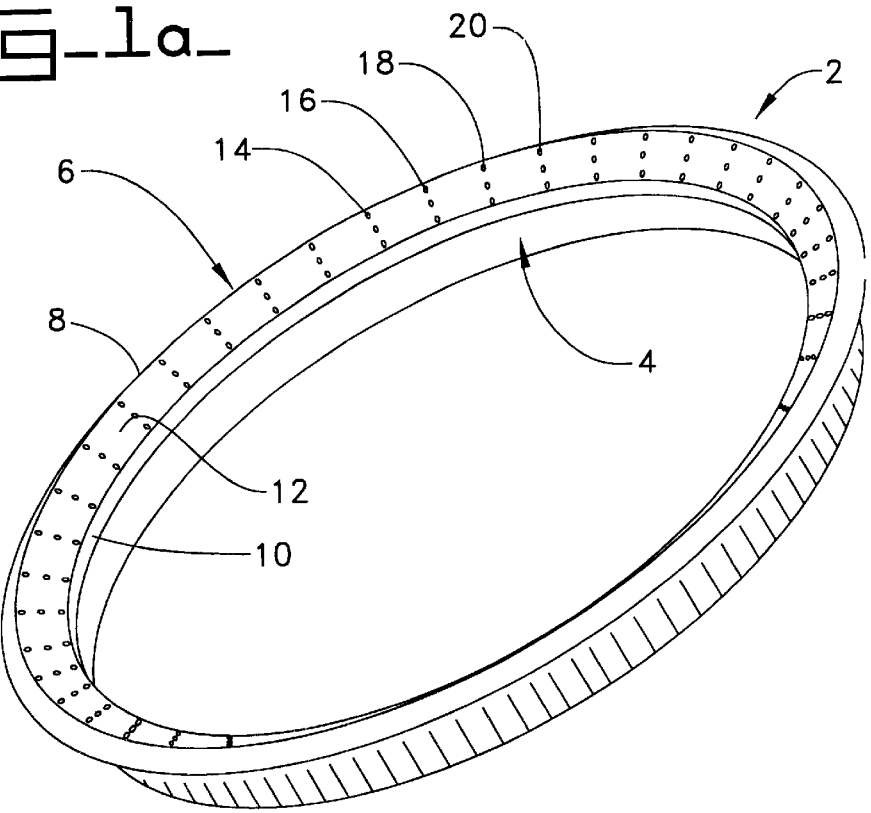
Fig-1a-
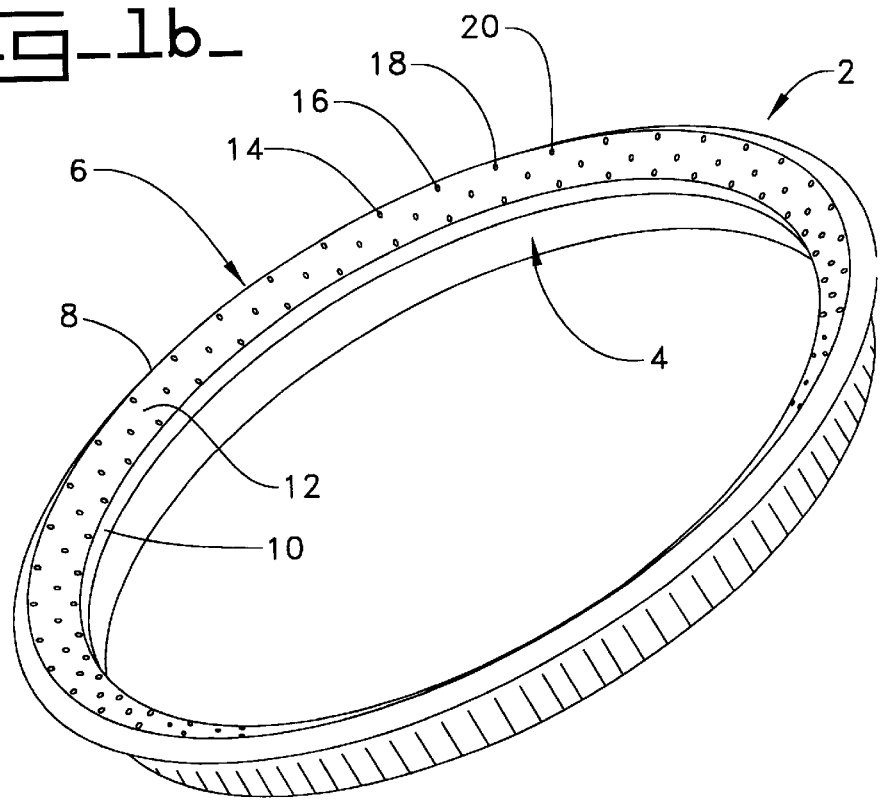
Fig-1b-

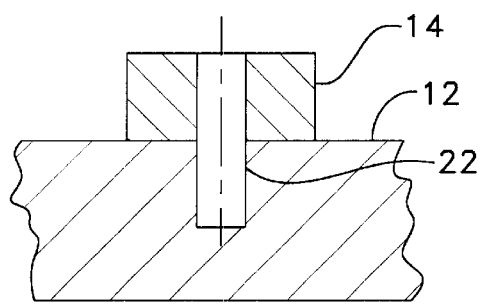
Fig_2a_
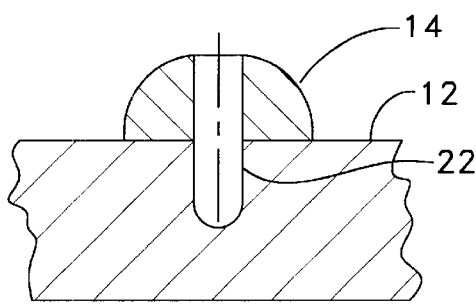
Fig_2b_
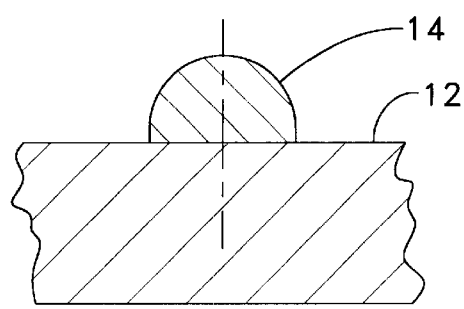
Fig_2c_
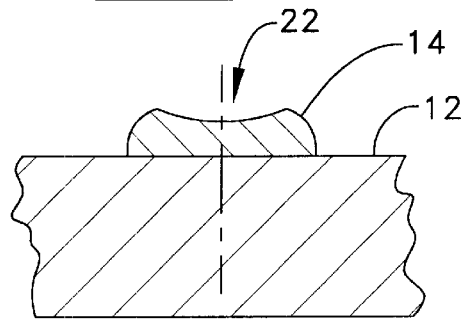
Fig_2d_
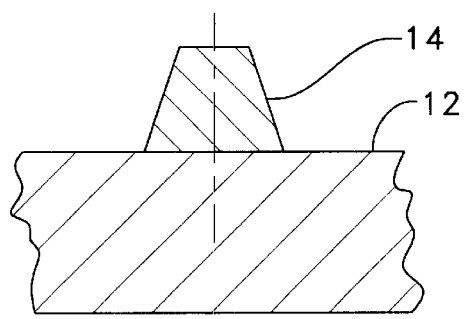
Fig_2e_
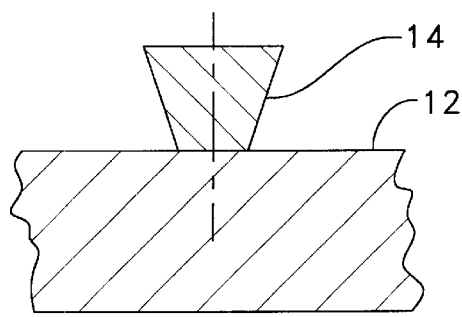
Fig_2f_
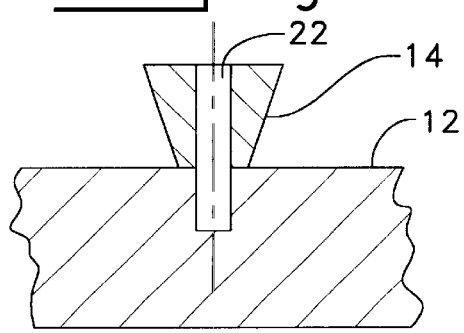
Fig_2g_
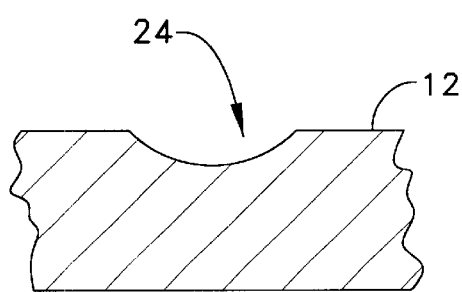
Fig_2h_

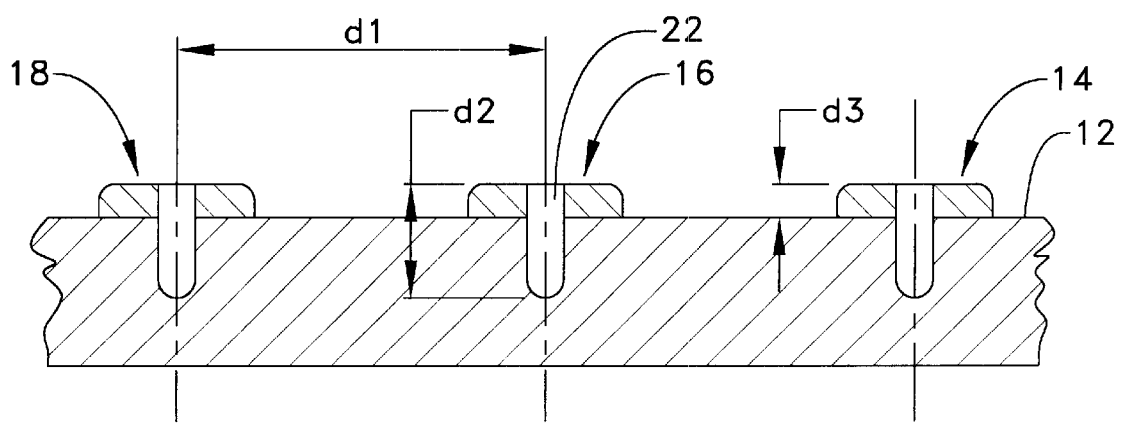
Fig_3_

WEAR IMPROVEMENT TO TEXTURED LIP SEAL

FIELD OF THE INVENTION

The present invention relates generally to wear resistance in seals, and more importantly to an improved mechanical seal to improve lubrication and minimize wear and leakage.

BACKGROUND OF THE INVENTION

Seals, such as axial seals for bushings, are commonly used in endless tracks of track-type earthmoving vehicles and pin joints of many types of heavy equipment, such as hydraulic excavators and wheel loaders. In relatively clean environments, a small amount of inward radial load is required on the sealing lip to seal lubricant within a joint. However, as the operating environment becomes dirtier and more severe, higher lip loads are required to ensure good sealability and to exclude the abrasive contaminants.

Extensive development work has been directed toward improving face seals for protecting the pin joints of an endless track chain. Such track chains operate in extremely abrasive environments under all types of weather conditions. Consequently, the axial face load of the seals must be maintained at a substantial level, for example above about 100 pounds (445 N), while the seals experience a considerable amount of axial motion between the track joint members.

This imposes substantial demands upon the materials that are utilized in the seal, since the seal must not only be sufficiently resilient to follow rapid movements of the joint members over a considerable temperature range, but must also exhibit a substantial wear life in order to retain lubricant within the joint and to exclude dirt.

As previously stated, track-type earthmoving vehicles present a severe environment for the seal. Given the environmental conditions surrounding a typical track-type earthmoving vehicle, abrasive contaminants, such as sand, dirt, rock, and water may enter the gap between the load ring and the bushing. The seal lip must prevent infiltration of the contaminants into the lubricated area. Thus, the seal lip experiences severe conditions, and if the contaminants get lodged under the seal lip, then a groove may be ground into the pin/bushing. Alternatively, the seal lip may finally fail as a result of the abrasion, which will then effectively produce the same groove in the pin/bushing. With a typical smooth contact surface on a seal, a very high axial force must be utilized to prevent the highly abrasive contaminants from being lodged under the seal lip.

Textured features on the contact surface of a seal to decrease the wear rate of mechanical seals caused by exposure to abrasive contaminants and high axial forces were disclosed in a patent application, Ser. No. 08/806,266. The texturing features of that invention were added interior to the outer peripheral edge of the contact surface of the seal. The single row of protrusions acted to break up dirt. Deformation of the protrusions when undergoing pressure placed on the surface of the seal served as fluid wells to introduce lubricant to the contact surface. The textured features included protrusions, protrusions with recesses, indentations, or combinations thereof. The textured features were a single row of protrusions with recesses, indentations, or combinations thereof.

For the most part, the prior art seals have proven only partially satisfactory toward solving the aforementioned problems. Although the single row of textured seals help increase the wear rate of the seal lip, there still exists leakage problems with these seals over time.

In view of the above, it would be advantageous to pro-vide a simple seal assembly having long life expectancy and operational effectiveness over a wide range of deflection in the severe service environment of a track joint or pin joint.

The seal assembly of the present invention is directed to overcome one or more of the problems associated as set forth above.

DISCLOSURE OF THE INVENTION

This invention encompasses the use of textured features on the contact surface of the seal between the inner peripheral edge and the outer peripheral edge. These multiple rows of textured features decrease the wear rate of mechanical seals by providing additional circumferential rows of similar textured features across the entire contact surface of the seal lip.

In another aspect of the invention, an assembly is contemplated, comprising multiple rows of textured features. Multiple rows of textured features are positioned between a first surface having an outer peripheral edge and an inner peripheral edge. A second surface, being substantially flat and pressed against the first surface, produce a seal assembly. In the preferred embodiment, the outer peripheral edge is raised.

BRIEF DESCRIPTION OF THE DRAWINGS

FIG. 1a is a diagrammatic representation of an embodiment of the present invention;

FIG. 1b is a diagrammatic representation of another embodiment of the present invention;

FIG. 2a shows an alternate embodiment of the shape of the textured features of the present invention;

FIG. 2b shows another alternate embodiment of the shape of the textured features of the present invention;

FIG. 2c shows another alternate embodiment of the shape of the textured features of the present invention;

FIG. 2d shows another alternate embodiment of the shape of the textured features of the present invention;

FIG. 2e shows another alternate embodiment of the shape of the textured features of the present invention;

FIG. 2f shows another alternate embodiment of the shape of the textured features of the present invention;

FIG. 2g shows another alternate embodiment of the shape of the textured features of the present invention;

FIG. 2h shows another alternate embodiment of the shape of the textured features of the present invention; and FIG. 3 is a diagrammatic representation, in cross-section, of the textured surface, according to one embodiment of the present invention.

BEST MODE FOR CARRYING OUT THE INVENTION

Referring now to FIG. 1a, an embodiment of a seal 2 of the present invention is shown. The seal 2 has a mounting ring 4, and a seal ring 6 bonded to the mounting ring 4, an outer peripheral edge 8, and an inner peripheral edge 10 and a contact surface 12. A plurality of circumferentially located protrusions 14,16,18,20 are formed on the contact surface 12. The multiple rows of textured features are formed in line with respect to one another. However, the multiple rows of circumferential protrusions need not be concentric to be within the scope of the present invention. In the preferred embodiment, there are three concentric circumferential rows of textured features on the contact surface, but either two rows or more than three rows are contemplated also within the invention(not shown).

Referring now to FIG. 1b, which shows an alternate embodiment of the seal 2 of the present invention, the multiple circumferential rows of textured features are not radially aligned but are staggered diagonally from one another. As in FIG. 1a, the preferred embodiment has three rows of textured features on the contact surface, but either two rows or more than three rows are contemplated within the invention(not shown). Also, as in FIG. 1a, the multiple rows of protrusions are concentric in the preferred embodiment but this invention contemplates that other arrangements may be used.

The seal of the present invention may be formed of elastomeric, thermoplastic, or thermoset materials. The preferred process to produce the seal of the invention is molding. Molding will produce a unitary construction which will be more resilient to wear. However, other mechanical or chemical processes to produce a seal of this nature are within the scope of the invention.

Turning now to FIG. 2a, FIG. 2b, FIG. 2c, FIG. 2d, FIG. 2e, FIG. 2f, FIG. 2g, and FIG. 2h, protrusions, indentations, recesses and combinations thereof are shown on the contact surface 12.

FIG. 2a shows the protrusion 14 having a cylindrical shape with a recess 22 having a cylindrical shape. FIG. 2b shows with the protrusion 14 having a hemispherical shape with the recess 22 having a cylindrical shape. FIG. 2c shows the protrusion 14 having a hemispherical shape without the recess. FIG. 2d shows the protrusion 14 having a cylindrical shape with the recess 22.

FIG. 2e shows the protrusion 14 having a conical shape without the recess. FIGS. 2f and 2g show the protrusion 14 having a conical shape without the recess 22 and with the recess, respectively. FIG. 2h shows an indentation 24 formed within the contact surface 12. The alternative embodiments are not intended to be all encompassing or to limit the scope of the invention as other shapes and configurations could be used to form the protrusion 14 and the recess 22.

The present invention contemplates that the protrusions may have a shape selected from the group comprising cylindrical, trapezoidal, rectangular, elliptical, spherical, conoidal, quonset-shaped, conical or discus. The protrusions of each embodiment may have identical geometric shape and identical size. Alternatively, each embodiment may have protrusions with different shapes and sizes.

While the dimensions of the recesses and protrusions do not limit the present invention, in a preferred embodiment, the depth of the recess to the outer diameter of the protrusion can be about 0.3:1.0 to 1.3:1.0 and the outer diameter of the recess to the diameter of the protrusions can be about 0.15:1.0 to 0.5:1.0.

Referring now to FIG. 3, the geometrical relationship between the various dimensions of the protrusions and recesses formed in the contact surface 12 is shown. While not intending to limit the possible spacing and size of the protrusions, indentations, recesses and combinations thereof, FIG. 3 shows an embodiment with equidistant spacing of the protrusions 14,16,18. The ratio of the equidistant spacing to the circumference of the circle 12, upon which the protrusions 14,16,18 are formed, is preferably in the range of about 1:200 to about 1:50 and more desirably in the range of about 1:125 to about 1:90. The spacing between protrusions 14,16,18 is designated as d1. The depth of the recess 22 is designated at d2. The height of the protrusion 14,16,18 is shown as equivalent in the embodiment shown. However, it is contemplated that d1, d2, and d3 may or may not have the same measurements for each protrusion 14,16,18, i.e. different shapes and sizes are contemplated within the invention.

In one embodiment of the present invention, the ratio of the depth d2 of the recess to the perpendicular distance d3 between the third surface of the protrusion and contact surface 12 is desirably in the range of about 2:1 to 8:1, and preferably about 4:1.

The present invention also contemplates that the multiple rows of textured features may be added to other rotating, oscillating, and reciprocating seal applications. In some constructions, the textured rows could be added to the inner diameter of the seal instead of the face of the seal, depending upon the location of the contacting surface of the seal.

Finally, an assembly is contemplated, comprising multiple rows of textured features. Multiple rows of textured features are positioned between a first surface having an outer peripheral edge and an inner peripheral edge. A second surface, being substantially flat and pressed against the first surface, produce a seal assembly. In the preferred embodiment, the outer peripheral edge is raised.

INDUSTRIAL APPLICABILITY

In the present invention, multiple circumferential rows of textured features are formed between the outer peripheral edge and the inner peripheral edge. The present invention contemplates two or more circumferential rows of textured features. Placement of the multiple circumferential rows of textured features between the inner and outer peripheral edge form a boundary for incoming dirt and wash away abrasive particles as well as act as lubricant wells. The multiple rows provide additional protection from leakage and wear.

These multiple rows of textured features decrease the wear rate of mechanical seals by providing additional circumferential rows of similar textured features across the entire contact surface of the seal lip. By placing texturing across the entire contact surface of the seal lip, the wear rate of mechanical seals are reduced by increased lubrication of the contact surface and additional resistance from the abrasive environmental contaminants. Additionally, as the single row on the outer peripheral edge wears, the second row continues to increase the lubrication of the interface and breaks up dirt and other contaminants. For example, if one of protrusions from one of the circumferential rows fails or becomes removed one of the other protrusions on another of the circumferential rows will protect the contact surface from wear. The use of multiple circumferential rows of textured features across the entire contact surface of the seal lip also helps prevent leakage of oil during use.

By placing texturing across the entire contact surface of the seal lip, the wear rate of mechanical seals are reduced by increased lubrication of the contact surface and additional resistance from the abrasive environmental contaminants. Additionally, as the single row on the outer peripheral edge wears, the second row continues to increase the lubrication of the interface and breaks up dirt and other contaminants. The use of multiple circumferential rows of textured features across the entire contact surface of the seal lip also helps prevent leakage of oil during use.

Though the present invention is not limited to the form of the protrusions, they may have a conical or cylindrical shape and a cross-sectional configuration of a polygon, circle, ellipse or a combination thereof. The protrusions may be identical in size and shape but different shapes and sizes of the protrusions within one embodiment is contemplated within the scope of this invention.

EXAMPLE

In laboratory bench tests, seals of the single row design and of the multiple row design were mounted in an apparatus where the seals were mounted with identical faceload pressures against a steel bushing. Both were observed for oil leakage.

After 360,000 cycles, the single row design had already shown an oil loss of 0.018 grams while the multiple row design had no oil loss. After 1,000,000 cycles, the single row design had already shown an oil loss of 0.102 grams while the multiple row design still had no oil loss. Then, both the single row design and the multiple row design were placed with identical faceload pressures against a steel bushing and were subjected to an abrasive environment similar to what each would experience in the field. After 1,500,000 cycles, the oil loss in the single row design was 0.404 grams while the multiple row design still showed no oil loss.

In a separate experiment, dynamic torque readings were also performed on both the single row and the multiple row design. Dynamic torque is an indication of the friction coefficient and the lubricity at the contact surface. With equivalent faceload, the multiple row design showed a decrease in dynamic torque, indicating a lower friction coefficient and better lubricity at the contact surface.

What is claimed is:

1. A seal with a contact surface comprising:
   an inner peripheral edge adjacent the contact surface;
   an outer peripheral edge adjacent the contact surface and raised relative to the inner peripheral edge; and
   multiple circumferential rows of textured features being positioned between said inner peripheral edge and said outer peripheral edge,
   wherein said textured features are selected from the group consisting of protrusions and indentations, said protrusions have recesses.

2. The seal of claim 1, wherein said protrusions and said indentations are aligned in a concentric geometry.

3. The seal of claim 1, wherein said protrusions are identical.

4. The seal of claim 1, wherein the spacing of said textured features are equidistant.

5. The seal of claim 1, wherein said protrusions and said indentations are of unitary construction and formed by integrally molding elastomeric, thermoplastic, or thermoset material.

6. An assembly, comprising:
   a first surface, said first surface having multiple concentric circumferential rows of textured features being positioned between an inner peripheral edge and a raised outer peripheral edge; and
   a second surface, said second surface being substantially flat and pressed against at least a portion of said first surface to form a seal,
   wherein said textured features are selected from the group consisting of
   protrusions and indentations, said protrusions have recesses.

7. The seal of claim 6, wherein said protrusions and said indentations are aligned in a concentric geometry.

8. The seal of claim 6, wherein said protrusions are identical.

9. The seal of claim 6, wherein the spacing of said textured features are equidistant.

10. The seal of claim 6, wherein said protrusions and said indentations are of unitary construction and formed by integrally molding elastomeric, thermoplastic, or thermoset material.

* * * * *